United States Patent
Suzuki et al.

(10) Patent No.: US 11,453,752 B2
(45) Date of Patent: Sep. 27, 2022

(54) METHOD FOR PRODUCING POLYARYLENE SULFIDE, DEHYDRATION METHOD, AND DEVICE FOR PRODUCING POLYARYLENE SULFIDE

(71) Applicant: Kureha Corporation, Tokyo (JP)

(72) Inventors: Kenji Suzuki, Tokyo (JP); Hiroshi Sakabe, Tokyo (JP); Michihisa Miyahara, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 17/597,377

(22) PCT Filed: Mar. 19, 2020

(86) PCT No.: PCT/JP2020/012193
§ 371 (c)(1),
(2) Date: Jan. 4, 2022

(87) PCT Pub. No.: WO2021/005839
PCT Pub. Date: Jan. 14, 2021

(65) Prior Publication Data
US 2022/0204700 A1    Jun. 30, 2022

(30) Foreign Application Priority Data

Jul. 9, 2019 (JP) .............................. JP2019-127561

(51) Int. Cl.
*C08G 75/025*    (2016.01)
(52) U.S. Cl.
CPC .................................. *C08G 75/025* (2013.01)

(58) Field of Classification Search
None
See application file for complete search history.

(56) References Cited

U.S. PATENT DOCUMENTS 4,368,321 A * 1/1983 Sherk ................. C08G 75/0231
528/388
4,371,671 A * 2/1983 Anderson ............ C08G 75/025
528/388

(Continued)

FOREIGN PATENT DOCUMENTS

CN    1325755 A    12/2001
CN    1558925 A    12/2004

(Continued)

OTHER PUBLICATIONS

Chinese Office Action for Application No. 202080046129.X, dated Mar. 30, 2022.

(Continued)

*Primary Examiner* — Ali Z Fadhel
(74) *Attorney, Agent, or Firm* — Colson Law Group, PLLC

(57) ABSTRACT

A method of producing a PAS according to an embodiment of the present invention includes: a polymerizing step; a water removal step; a hydrogen sulfide recovering step in which hydrogen sulfide contained in a gas component produced in the water removal step is absorbed and recovered by an aqueous solution of an alkali metal hydroxide; and a condensation step in which the gas component produced in the water removal step is condensed. The hydrogen sulfide recovering step is performed before the condensation step.

14 Claims, 2 Drawing Sheets

(56) References Cited

U.S. PATENT DOCUMENTS

| | | | | |
|---|---|---|---|---|
| 4,767,841 A * | 8/1988 | Goetz | ................ | C08G 75/0213 |
| | | | | 528/388 |
| 5,200,499 A * | 4/1993 | Geibel | ............... | C08G 75/0213 |
| | | | | 528/387 |
| 5,840,830 A | 11/1998 | Miyahara et al. | | |
| 6,337,062 B1 * | 1/2002 | Akiba | .................... | C01B 17/38 |
| | | | | 423/566.2 |
| 8,138,302 B2 * | 3/2012 | Sato | .................. | C08G 75/0259 |
| | | | | 528/381 |
| 2002/0006371 A1 | 1/2002 | Watson | | |
| 2004/0249118 A1 | 12/2004 | Kagoshima et al. | | |
| 2006/0089486 A1 | 4/2006 | Sato et al. | | |
| 2011/0319587 A1 | 12/2011 | Hinokimori | | |
| 2014/0128568 A1 | 5/2014 | Hinokimori | | |
| 2015/0087778 A1 * | 3/2015 | Chiong | ................ | B01J 19/0046 |
| | | | | 524/608 |
| 2019/0338075 A1 | 11/2019 | Miyahara et al. | | |
| 2021/0147630 A1 | 5/2021 | Kadoki et al. | | |

FOREIGN PATENT DOCUMENTS

| | | |
|---|---|---|
| CN | 1732210 A | 2/2006 |
| CN | 102224187 A | 10/2011 |
| CN | 102432879 A | 5/2012 |
| CN | 102675682 A | 9/2012 |
| CN | 109071815 A | 12/2018 |
| JP | 2-160833 A | 6/1990 |
| JP | 9-286861 A | 11/1997 |
| JP | 2015-218214 A | 12/2015 |
| WO | 2003/029328 A1 | 4/2003 |
| WO | 2004/060974 A1 | 7/2004 |
| WO | 2018/135372 A1 | 7/2018 |
| WO | 2019/004171 A1 | 1/2019 |

OTHER PUBLICATIONS

Korean Office Action for Application No. 10-2022-7003820, dated Mar. 21, 2022.
International Preliminary Report on Patentability for PCT/JP2020/012193, dated Jan. 20, 2022.
Office Action Issued for Japanese Patent Application No. 2021-530487, dated Dec. 21, 2021.
CN Search Report for Application No. 202080046129, dated Mar. 24, 2022.
Office Action for Japanese Patent Application No. 2021-530487, dated Apr. 19, 2019.

\* cited by examiner

METHOD FOR PRODUCING POLYARYLENE SULFIDE, DEHYDRATION METHOD, AND DEVICE FOR PRODUCING POLYARYLENE SULFIDE

TECHNICAL FIELD

The present invention relates to a method of producing a polyarylene sulfide, a water removal treatment method, and a polyarylene sulfide production apparatus.

BACKGROUND ART

Polyphenylene sulfides (hereinafter also referred to as "PPSs"), represented by polyphenylene sulfides (hereinafter also referred to as "PPSs"), are engineering plastics with excellent heat resistance, chemical resistance, flame retardancy, mechanical strength, electrical characteristics, dimensional stability, and the like. PASs can be formed into various molded products, films, sheets, fibers, and the like by a common melt processing method, such as extrusion molding, injection molding, and compression molding. Thus, PASs are used for various purposes in a wide range of technical fields, such as electrical devices, electronic devices, devices for automobiles, and packaging materials.

In production of a PAS, a sulfur source used as a raw material usually contains water, and thus water needs to be removed from the raw material before a polymerizing step of the PAS. In addition, in removing water from the raw material, hydrogen sulfide derived from the sulfur source used as a reaction raw material volatilizes, and thus the hydrogen sulfide needs to be recovered.

For example, Patent Document 1 discloses a PAS production apparatus for recovering hydrogen sulfide produced in removing water from a water-containing sulfur source, a raw material for the PAS, by bringing the hydrogen sulfide into contact with an organic polar solvent and further bringing into contact with an aqueous solution of an alkali metal hydroxide.

CITATION LIST

Patent Document
Patent Document 1: WO 2018/135372

SUMMARY OF INVENTION

Technical Problem

However, even when the PAS production apparatus disclosed in Patent Document 1 is used, a small amount of hydrogen sulfide is contained in the waste gas and waste water after the hydrogen sulfide recovery treatment. From the viewpoint of reducing the environmental load or the like, the amount of hydrogen sulfide contained in the waste gas and waste water is desirably reduced further. In particular, recovering hydrogen sulfide contained in the waste water is strongly desired.

The present invention has been made in view of the problems described above, and an object of the present invention is to provide a method of producing a PAS and a PAS production apparatus that can reduce the emission of hydrogen sulfide produced in removing water from a water-containing sulfur source, a raw material for the PAS to the outside of the reaction system.

Solution to Problem

The present inventors found that the problems described above can be solved by performing treatment to absorb and recover hydrogen sulfide produced in removing water from a water-containing sulfur source, a raw material for the PAS, before condensing a gas component produced by the water removal, and completed the present invention.

A method of producing a PAS according to an embodiment of the present invention includes:
a polymerizing step in which at least one sulfur source selected from an alkali metal sulfide, an alkali metal hydrosulfide, and hydrogen sulfide and a dihalo aromatic compound are polymerized in an organic polar solvent,
in which the sulfur source is supplied as a raw material mixture containing water,
the method further includes:
a water removal step in which the raw material mixture is heated to remove water;
a hydrogen sulfide recovering step in which hydrogen sulfide contained in a gas component produced in the water removal step is absorbed by an aqueous solution of an alkali metal hydroxide to obtain a recovered liquid; and
a condensation step in which the gas component produced in the water removal step is condensed, and
the hydrogen sulfide recovering step is performed before the condensation step.

In addition, a water removal treatment method according to an embodiment of the present invention is a water removal treatment method for a raw material mixture used in production of a polyarylene sulfide and includes:
a water removal step in which a raw material mixture containing at least one sulfur source selected from an alkali metal sulfide, an alkali metal hydrosulfide, and hydrogen sulfide, and water is heated to remove water;
a hydrogen sulfide recovering step in which hydrogen sulfide contained in a gas component produced in the water removal step is absorbed by an aqueous solution of an alkali metal hydroxide to obtain a recovered liquid; and
a condensation step in which the gas component produced in the water removal step is condensed,
in which the hydrogen sulfide recovering step is performed before the condensation step.

Furthermore, a PAS production apparatus according to an embodiment of the present invention includes:
a polymerization unit for polymerizing at least one sulfur source selected from an alkali metal sulfide, an alkali metal hydrosulfide, and hydrogen sulfide and a dihalo aromatic compound in an organic polar solvent,
a water removing unit for heating a raw material mixture containing at least one sulfur source selected from an alkali metal sulfide, an alkali metal hydrosulfide, and hydrogen sulfide, and water to remove water;
a hydrogen sulfide recovery unit for absorbing and recovering hydrogen sulfide contained in a gas component produced in the water removing unit by an aqueous solution of an alkali metal hydroxide; and
a condensing unit for condensing a gas component from which hydrogen sulfide has been recovered by the hydrogen sulfide recovery unit,
in which the hydrogen sulfide recovery unit is provided on an upstream side of the condensing unit.

Advantageous Effects of Invention

An aspect of the present invention can provide the method of producing a PAS and the PAS production apparatus that can sufficiently reduce the emission of hydrogen sulfide produced in removing water from the water-containing sulfur source, the raw material for the PAS to the outside of the reaction system.

DESCRIPTION OF EMBODIMENTS

Method of Producing PAS

Figure 1:
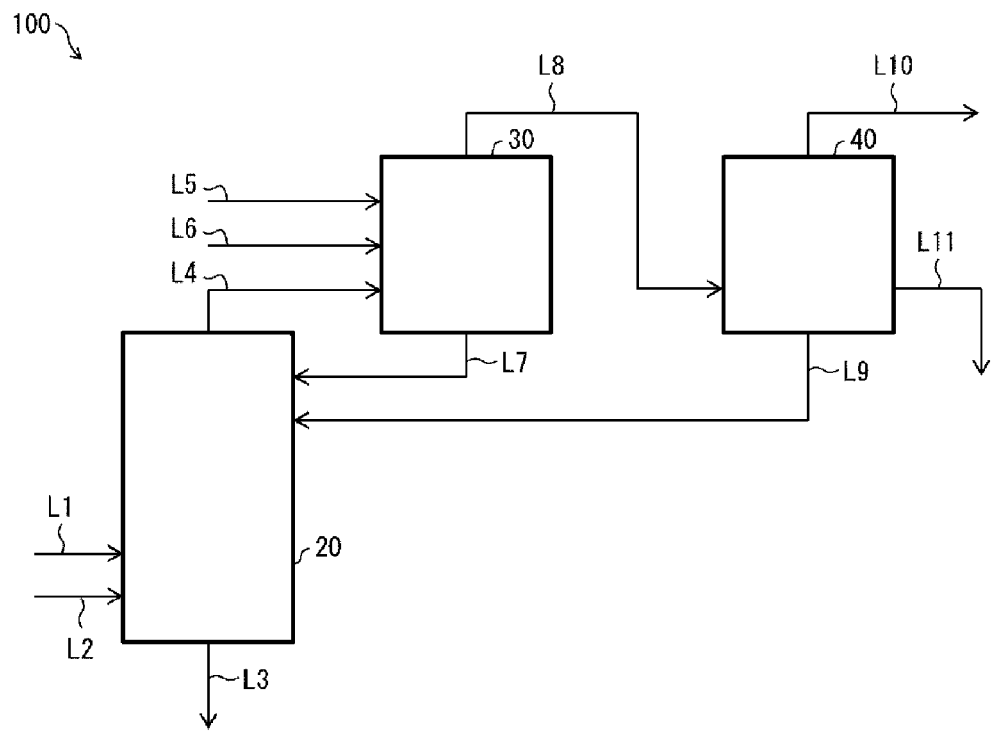
FIG. 1 is a schematic diagram illustrating an embodiment of a PAS production apparatus according to the present invention.

A method of producing a polyarylene sulfide (PAS) according to the present embodiment includes a water removal step, a hydrogen sulfide recovering step, a condensation step, and a polymerizing step. Each step will be described below.

Water Removal Step

In the water removal step, a raw material mixture containing a sulfur source to be used in the production of a PAS is heated to remove water. The raw material mixture contains water, and the sulfur source is supplied as a raw material mixture containing water.

Examples of the sulfur source include alkali metal sulfides, alkali metal hydrosulfides, and hydrogen sulfide, and the sulfur source is preferably an alkali metal sulfide and an alkali metal hydrosulfide. The sulfur source can be handled, for example, in a state of an aqueous slurry or an aqueous solution and is preferably in a state of an aqueous solution from the viewpoints of handleability, such as measurability and transportability. Examples of the alkali metal sulfide include lithium sulfide, sodium sulfide, potassium sulfide, rubidium sulfide, and cesium sulfide. Examples of the alkali metal hydrosulfide include lithium hydrosulfide, sodium hydrosulfide, potassium hydrosulfide, rubidium hydrosulfide, and cesium hydrosulfide. When hydrogen sulfide is used as the sulfur source, the sulfur source can be treated as a gas or a liquid, such as a solution, and can be supplied before the water removal step and/or to the water removal step. Furthermore, an alkali metal hydroxide is supplied before the water removal step and/or to the water removal step, and thus hydrogen sulfide of the sulfur source is neutralized, and water is produced. Thus, also when hydrogen sulfide is used as the sulfur source, the sulfur source becomes a mixture containing water. A mixture after heating an alkali metal sulfide and/or an alkali metal hydrosulfide, and an organic polar solvent to 80 to 220° C. may be supplied as the raw material mixture.

The water removal treatment may be performed in a state where an organic polar solvent and a dihalo aromatic compound described later used in the polymerization are mixed in the raw material mixture. In addition, the raw material mixture may contain a polymerization auxiliary agent described later or the like.

The water removal time is a period of time until a water content per mole of the sulfur source in the raw material mixture with a reduced water content reaches 1.7 moles or lower. When water is consumed in hydrolysis of the organic polar solvent, this water is also included. The water removal can be performed usually with a water removal time, for example, of 0.5 to 10 hours and preferably of 1 to 5 hours.

The water removal temperature, for example, when the water removal step is performed in a continuous manner is usually from 110° C. to 270° C., preferably from 140° C. to 250° C., and more preferably from 150° C. to 235° C. Water can be removed in a range of 190° C. to 270° C., preferably of 193° C. to 250° C., and more preferably of 195° C. to 235° C. in a period of time of 50% or longer, preferably 70% or longer, and more preferably 90% or longer of the time to perform the water removal step.

When the water removal step is performed by batch, the water removal step can be usually performed within a water removal temperature range from 100 to 270° C. To prevent foaming, the water removal temperature is preferably from 100 to 220° C.

Heating the raw material mixture allows water in the raw material mixture to become steam, and the heating also allows hydrogen sulfide as a sulfur source or a part of hydrogen sulfide produced from the alkali metal sulfide or the alkali metal hydrosulfide to vaporize. As a result, hydrogen sulfide is contained in a gas component produced in the water removal step. When the water removal treatment is performed in a state where the organic polar solvent and the dihalo aromatic compound are mixed in the raw material mixture, the organic polar solvent and the dihalo aromatic compound are also contained in the gas component.

Hydrogen Sulfide Recovering Step

In the hydrogen sulfide recovering step, hydrogen sulfide contained in a gas component produced in the water removal step is absorbed and recovered by an aqueous solution of an alkali metal hydroxide to obtain a recovered liquid. In the related art, hydrogen sulfide contained in a gas component produced in water removal has been absorbed and recovered by an aqueous solution of an alkali metal hydroxide, an organic polar solvent, and the like after condensing water by a condenser or the like. However, in the present embodiment, the hydrogen sulfide recovering step is performed before the condensation step described later.

Hydrogen sulfide is brought into contact with an aqueous solution of an alkali metal hydroxide, and this allows a reaction shown in Formula (1) below to occur. As shown in Formula (1), hydrogen sulfide is converted to an alkali metal sulfide and is present in a recovered liquid containing the aqueous solution of an alkali metal hydroxide. This can recover vaporized hydrogen sulfide as a sulfur source.

$$H_2S + 2XOH \rightarrow X_2S + 2H_2O \qquad (1)$$

where in Formula (1), X represents an alkali metal.

From the viewpoints of bringing hydrogen sulfide into contact with a sufficient amount of the aqueous solution of an alkali metal hydroxide, polymerizing a PAS in a continuous manner, and thus also continuously performing the water removal step, the aqueous solution of an alkali metal hydroxide is preferably supplied continuously, for example, by an alkali metal hydroxide supply step. The supplied aqueous solution of an alkali metal hydroxide is brought into contact with a gas component containing hydrogen sulfide, thereby enabling hydrogen sulfide to be recovered from the gas component. In addition, in the hydrogen sulfide recovering step, supplying the aqueous solution of an alkali metal hydroxide improves the recovery efficiency for hydrogen sulfide.

Examples of the alkali metal hydroxide include, but are not limited to, lithium hydroxide, sodium hydroxide, potassium hydroxide, rubidium hydroxide, cesium hydroxide, and mixtures of two or more of these. Among these, sodium hydroxide is preferred from the viewpoint of industrial availability at a low price.

The concentration of the aqueous solution of an alkali metal hydroxide is not particularly limited, but is more preferably from 5 to 80 mass % and even more preferably from 10 to 77 mass % from the viewpoints of maintaining the solution state throughout the hydrogen sulfide recovering step and efficiently performing the water removal step.

As described above, the hydrogen sulfide recovering step in the present embodiment is performed before the condensation step described later. Performing the hydrogen sulfide recovering step before the condensation step can recover more hydrogen sulfide produced by the water removal step compared to a method in the related art, in which hydrogen sulfide is recovered after condensation. For example, in the related art, hydrogen sulfide contained in a gas component produced in water removal has been absorbed and recovered by an aqueous solution of an alkali metal hydroxide after condensing water by a condenser or the like. In this case, the condensed water in which hydrogen sulfide was dissolved was treated as waste water. In the present embodiment, the hydrogen sulfide recovering step is performed before the condensation step, and this can effectively reduce hydrogen sulfide dissolved in the condensed water in the condensation step. Recovering more hydrogen sulfide can reduce the emission of hydrogen sulfide to the outside of the reaction system and thus reduce the environmental load. Furthermore, the recovered hydrogen sulfide is returned to the reaction system as a sulfur source in a resupply step described later. Thus, reducing the emission of hydrogen sulfide to the outside of the reaction system increases the amount of the sulfur source to be used in the reaction and thus can improve the yield. In addition, reducing the emission of hydrogen sulfide to the outside of the reaction system facilitates performing the reaction at the intended concentration and amount of the sulfur source.

Condensation Step

In the condensation step, a component that can be condensed in a gas component produced in the water removal step is condensed. However, in the present embodiment, the gas component produced in the water removal step is first subjected to the hydrogen sulfide recovering step. Thus, the gas component subjected to the condensation step is the gas component after undergoing the hydrogen sulfide recovering step, that is, the gas component after being brought into contact with the aqueous solution of an alkali metal hydroxide. The condensation can be performed by a known method and can be performed, for example, using a condenser. After the condensation step, the liquid phase is disposed of as waste liquid. In addition, a dihalo aromatic compound when contained in the waste liquid may be separated from the liquid phase and recovered, and the recovered dihalo aromatic compound may be reused as a raw material for the polymerization reaction. A gas remaining after the condensation step is disposed of as waste gas or sent to an exclusion facility.

Hydrogen Sulfide Additional Recovering Step

In the present embodiment, after the hydrogen sulfide recovering step, the method may further include a hydrogen sulfide additional recovering step in which hydrogen sulfide remaining in the gas component is absorbed and recovered by an organic polar solvent or an aqueous solution of an alkali metal hydroxide. The presence of the two-stage steps of absorbing and recovering hydrogen sulfide can further reduce the emission of hydrogen sulfide contained in the gas component produced in the water removal step to the outside of the reaction system. In the hydrogen sulfide additional recovering step, hydrogen sulfide is absorbed preferably using an organic polar solvent from the viewpoint of increasing the recovery efficiency for hydrogen sulfide. The hydrogen sulfide additional recovering step is performed after the water removal step and can be performed, for example, after the hydrogen sulfide recovering step and before the condensation step or after the condensation step.

In the hydrogen sulfide additional recovering step, for example, when one absorption column is used, hydrogen sulfide can be brought into contact with the aqueous solution of an alkali metal hydroxide at the lower part of the column (on the upstream side of the flow of hydrogen sulfide) and can be brought into contact with the organic polar solvent at the upper part of the column (on the downstream side of the flow of hydrogen sulfide). When a plurality of columns is used, for example, hydrogen sulfide can be brought into contact with the aqueous solution of an alkali metal hydroxide in a column on the upstream side of the flow of hydrogen sulfide and can be brought into contact with the organic polar solvent or the aqueous solution of an alkali metal hydroxide in a column on the downstream side of the flow of hydrogen sulfide.

The organic polar solvent may be the same as or different from an organic polar solvent used in the polymerizing step described later. From the viewpoint, such as improving workability, the organic polar solvent used to recover hydrogen sulfide in the hydrogen sulfide additional recovering step is preferably the same as an organic polar solvent used in the polymerizing step.

In addition, the recovered liquid, in which hydrogen sulfide has been recovered, obtained in the hydrogen sulfide additional recovering step can also be further supplied to the hydrogen sulfide recovering step.

Resupply Step

In the present embodiment, the method may further include a resupply step in which the recovered liquid, in which hydrogen sulfide has been recovered, obtained in the hydrogen sulfide recovering step or the hydrogen sulfide additional recovering step is added to the raw material mixture to be used in the production of a PAS, or to an organic polar solvent or a reaction mixture in the polymerizing step described later. In the present specification, the "reaction mixture" refers to a mixture in which the sulfur source and the dihalo aromatic compound have been polymerized and the organic polar solvent is contained. The resupply step enables hydrogen sulfide recovered in the hydrogen sulfide recovering step to be also used in the polymerization reaction and thus can improve the yield.

Polymerizing Step

In the polymerizing step, at least one sulfur source selected from an alkali metal sulfide, an alkali metal hydrosulfide, and hydrogen sulfide and a dihalo aromatic compound are polymerized in an organic polar solvent. In the polymerizing step, the raw material mixture water (raw material mixture with a reduced water content) removed by the water removal step and a dihalo aromatic compound are mixed in a reaction vessel, a polymerization reaction of the sulfur source and the dihalo aromatic compound is performed in an organic polar solvent, and a PAS can be produced. For the organic polar solvent and the dihalo aromatic compound, those usually used in the production of a PAS can be used.

Specifically, examples of the organic polar solvent include organic amide solvents; aprotic organic polar solvents formed from an organosulfur compound; and aprotic organic polar solvents formed from a cyclic organophosphorus compound. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (hereinafter also referred to as "NMP") and N-cyclohexyl-2-pyrrolidone; N,N-dialkylimidazolidinone compounds, such as 1,3-dialkyl-2-imidazolidinone, tetraalkyl urea compounds, such as tetramethyl urea; and hexaalkylphosphate triamide compounds, such as hexamethyl phosphate triamide. Examples of the aprotic organic polar solvent formed from an organosulfur compound include dimethyl sulfoxide and diphenyl sulfone. Examples of the aprotic organic polar solvent formed from a cyclic organophosphorus compound include 1-methyl-1-oxophosphorane. Among these, from the viewpoints, such as availability and handleability, the organic polar solvent is preferably an organic amide solvent; more preferably an N-alkyl pyrrolidone compound, an N-cycloalkyl pyrrolidone compound, an N-alkyl caprolactam compound, and an N,N-dialkyl imidazolidinone compound; even more preferably NMP, N-methyl-ε-caprolactam, and 1,3-dialkyl-2-imidazolidinone; and particularly preferably NMP. The organic polar solvent is used in an amount preferably of 0.5 to 30 moles and more preferably of 1 to 15 moles relative to 1 mole of the sulfur source from the viewpoint, such as efficiency of the polymerization reaction.

In addition, examples of the dihalo aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides, and dihalodiphenyl ketones, and the halogen atom refers to each atom of fluorine, chlorine, bromine, and iodine. The two halogen atoms in the dihalo aromatic compound may be the same or different. Among these, from the viewpoints, such as availability and reactivity, the dihalo aromatic compound is preferably a p-dihalobenzene, a m-dihalobenzene, and a mixture of both of these, more preferably a p-dihalobenzene, and particularly preferably a p-dichlorobenzene (hereinafter also referred to as "pDCB"). The dihalo aromatic compound is used in an amount preferably from 0.90 to 1.50 moles, more preferably from 0.92 to 1.10 moles, and even more preferably from 0.95 to 1.05 moles relative to 1 mole of the charged amount of the sulfur source. Using the dihalo aromatic compound within the range described above makes a decomposition reaction less likely to occur, facilitates performing a stable polymerization reaction and producing a high-molecular weight polymer.

To produce a branched or crosslinked polymer, a polyhalo compound (not needing to be necessarily an aromatic compound) in which three or more halogen atoms are bonded, an active hydrogen-containing halogenated aromatic compound, a halogenated aromatic nitro compound, or the like can be used in combination. Examples of the polyhalo compound as a branching/crosslinking agent preferably include trihalobenzenes.

The polymerization reaction is a polymerization reaction in which a mixture containing the sulfur source and the dihalo aromatic compound is heated to initiate a polymerization reaction, and a polymer with a weight average molecular weight of 2000 or greater is produced.

In the polymerization reaction, from the viewpoint, such as efficiency of the polymerization reaction, the polymerization reaction is preferably performed under heating at a temperature of 170 to 300° C. The polymerization temperature is more preferably in the range from 180 to 280° C. to prevent a side reaction and a decomposition reaction.

The conversion rate of the dihalo aromatic compound is preferably from 50 to 100%, more preferably from 60 to 100%, even more preferably from 65 to 100%, and particularly preferably from 70 to 100%. The conversion rate of the dihalo aromatic compound can be calculated by determining the amount of the dihalo aromatic compound remaining in the reaction mixture by gas chromatography and performing a calculation based on the remaining amount of the dihalo aromatic compound and the charged amount of the dihalo aromatic compound.

To obtain a higher molecular weight PAS, the polymerization reaction can be performed in two or more separate stages. The polymerization reaction is preferably performed, for example, by performing a pre-stage polymerization reaction of the sulfur source and the dihalo aromatic compound at a relatively low temperature and then performing a post-stage polymerization at a relatively high temperature. The pre-stage polymerization reaction is preferably a polymerization reaction in which a mixture containing the sulfur source and the dihalo aromatic compound is heated to initiate the polymerization reaction, and a prepolymer with a conversion rate of the dihalo aromatic compound of 50% or higher is produced. In particular, in the pre-stage polymerization reaction, preferably, the polymerization reaction is initiated under heating at a temperature of 170 to 270° C., and a prepolymer with a conversion rate of the dihalo aromatic compound of 50% or higher is produced from the viewpoint, such as efficiency of the polymerization reaction.

The polymerization temperature in the pre-stage polymerization reaction is preferably selected from the range from 180 to 265° C. to prevent a side reaction and/or a decomposition reaction. In the post-stage polymerization, the polymerization reaction is allowed to proceed at a temperature of 230 to 300° C., preferably of 235 to 280° C., to make the conversion rate of the dihalo aromatic compound 80% or higher, preferably 90% or higher, and a high molecular weight polymer is produced.

Polymerization Auxiliary Agent

In addition, the polymerizing step may be performed in the presence of a polymerization auxiliary agent of a PAS. The presence of extra water inhibits polymerization of the PAS, and thus water associated with the polymerization auxiliary agent is preferably removed together with water in the raw material mixture.

Specific examples of such a polymerization auxiliary agent include organic carboxylate salts, organic sulfonate salts, alkali metal sulfates, alkaline earth metal oxides, alkali metal phosphates, and alkaline earth metal phosphates. These can be used alone, or two or more at the same time. Among these, an organic carboxylate salt, particularly a sodium salt, potassium salt, or lithium salt of a C2-C12 organic carboxylic acid is preferably used. More specifically, examples include a sodium salt, potassium salt, or lithium salt of a short chain fatty acid or aromatic carboxylic acid. Among these, the organic carboxylate salt is preferably a sodium salt, potassium salt, or lithium salt of acetic acid, propionic acid, isobutyric acid, butyric acid, isovaleric acid, valeric acid, caproic acid, lactic acid, succinic acid, benzoic acid, phenylacetic acid, p-toluic acid, and the like. One, or two or more of the organic carboxylate salts can be used at the same time. From the viewpoint of accelerating the polymerization reaction, a sodium or lithium salt of acetic acid, caproic acid, valeric acid, isovaleric acid, 2-ethylbutyric acid, or benzoic acid is preferably used.

These materials may be used alone, or two or more of them may be used by mixing in any combination that can produce the PAS. In addition, these materials may be used in the form of an acid or a corresponding alkali metal hydroxide.

The amount of the polymerization auxiliary agent to be supplied depends on the type of compound, but the polymerization auxiliary agent is usually supplied in the range from 0.01 to 5.0 moles, preferably of 0.02 to 1.0 mole, more preferably of 0.03 to 0.9 moles, and particularly preferably of 0.05 to 0.8 moles relative to 1 mole of the sulfur source supplied.

The polymerization is any method known in the art and is not particularly limited, and can be performed by a known method, such as in a continuous manner or by batch.

For example, the method of producing a PAS in a continuous manner can be achieved by performing the water removal step, the hydrogen sulfide recovering step, and the polymerizing step in parallel in the method of producing a PAS of the present embodiment. In addition, performing these steps in parallel enables resource saving, energy saving, and equipment cost reduction. Furthermore, in addition to the water removal step, the hydrogen sulfide recovering step, and the polymerizing step, any one or more of the resupply step, the condensation step, and the hydrogen sulfide additional recovering step may be performed in parallel.

The molar ratio of the sulfur source present in a liquid emitted after the condensation step to the sulfur source contained in the raw material mixture is preferably from 0 to 3 mol %, more preferably from 0 to 2 mol %, and even more preferably from 0 to 1 mol %. The sulfur source present in the liquid emitted after the condensation step is a sulfur source that requires special harm elimination/waste water treatment. Controlling the amount of the sulfur source present in the liquid emitted after the condensation step within the range described above achieves an effect of enabling the cost reduction of the waste water treatment. Furthermore, recycling the sulfur source present in the liquid emitted after the condensation step to the polymerizing step and the water removal step is difficult. Thus, controlling the amount of the sulfur source present in the liquid emitted after the condensation step within the range described above also achieves an effect of enabling the improvement of the controllability of the sulfur source, which is an important controlling factor for the polymerizing step.

Water Removal Treatment Method

As described above, the method of producing a PAS of the present embodiment can reduce the emission of hydrogen sulfide produced by the water removal step to the outside of the reaction system and can reduce the environmental load. Thus, the present embodiment also provides a water removal treatment method for the raw material mixture, the method capable of reducing the emission of hydrogen sulfide to the outside of the reaction system. Specifically, the water removal treatment method according to the present embodiment is a water removal treatment method for the raw material mixture used in the production of a PAS and includes the water removal step, the hydrogen sulfide recovering step, and the condensation step described above. In addition, as in the method of producing a PAS described above, the hydrogen sulfide recovering step is performed before the condensation step. In the water removal treatment method of the present embodiment, performing the hydrogen sulfide recovering step before the condensation step can effectively recover more hydrogen sulfide produced by the water removal step in the hydrogen sulfide recovering step compared to a method in the related art, in which hydrogen sulfide is recovered after condensation. As a result, the method can sufficiently reduce the emission of hydrogen sulfide to the outside of the reaction system and reduce the environmental load.

PAS Production Apparatus

A PAS production apparatus according to the present embodiment will be described below with reference to FIG. 1. FIG. 1 is a schematic diagram illustrating a configuration of a PAS production apparatus 100 according to the present embodiment.

The PAS production apparatus 100 includes, from the upstream side toward the downstream side, a water removing polymerization unit 20, a hydrogen sulfide recovery unit 30 connected to the water removing polymerization unit 20, and a condensing unit 40 connected to the hydrogen sulfide recovery unit 30.

Water Removing Polymerization Unit 20

The water removing polymerization unit 20 is a device for heating a raw material mixture to remove water and polymerizing a sulfur source and a dihalo aromatic compound in an organic polar solvent to produce a PAS.

To the water removing polymerization unit 20 is connected a raw material supply line L2, and raw materials for a PAS, such as a mixture of the organic polar solvent, the sulfur source, and the dihalo aromatic, are supplied through the raw material supply line L2. The sulfur source is supplied as a raw material mixture containing water as described above in the method of producing a PAS. The raw materials for a PAS may contain the polymerization auxiliary agent described above. The "raw materials for a PAS" in the present specification are intended that a solvent and the polymerization auxiliary agent necessary for polymerization of a PAS may be contained in addition to the sulfur source and the dihalo aromatic compound serving as constituent components of the PAS.

Although FIG. 1 illustrates only one raw material supply line L2, different lines may each be provided for each raw material for the PAS to be supplied. The raw materials for the PAS may be supplied in a premixed state, and in this case, one raw material supply line L2 may be provided.

To the water removing polymerization unit 20 is connected a reaction mixture recovery line L3, and a reaction mixture containing the PAS produced in the water removing polymerization unit 20, the organic polar solvent, and an alkali metal halide is recovered through the reaction mixture recovery line L3.

To the water removing polymerization unit 20 is connected a gas delivery line L4, and the water removing polymerization unit 20 communicates with the hydrogen sulfide recovery unit 30 through the gas delivery line L4. In the water removing polymerization unit 20, a gas component produced by heating the raw material mixture and a gas component produced in the polymerizing step are transferred through the gas delivery line L4 to the hydrogen sulfide recovery unit 30.

In the example illustrated in FIG. 1, the water removing polymerization unit 20 plays both roles of a polymerization unit for polymerizing the sulfur source and the dihalo aromatic compound and a water removing unit for heating the raw material mixture to remove water, but the polymerization unit and the water removing unit may each be provided separately.

In addition, in the present embodiment, to the water removing polymerization unit 20 is connected a gas supply line L1 for supplying an inert gas. Supplying an inert gas from the gas supply line L1 can prevent condensation of evaporated water in the water removing polymerization unit 20. Examples of the inert gas include noble gases, such as argon; and nitrogen.

The water removing polymerization unit 20 is not particularly limited, and for example, a known polymerization vessel also serving as a water removing vessel or a combination of a water removing vessel and a polymerization vessel can be used by batch or in a continuous manner.

Hydrogen Sulfide Recovery Unit 30

The hydrogen sulfide recovery unit 30 is connected to the water removing polymerization unit 20 via the gas delivery line L4. To the hydrogen sulfide recovery unit 30 is supplied from the gas delivery line L4 at least the gas component produced by heating the raw material mixture in the water removing polymerization unit 20.

In addition, to near the central portion of the hydrogen sulfide recovery unit 30 is connected an alkali metal hydroxide supply line L6 for supplying an aqueous solution of an alkali metal hydroxide. In the hydrogen sulfide recovery unit 30, the gas component sent from the water removing polymerization unit 20 is brought into contact with an aqueous solution of an alkali metal hydroxide continuously supplied from the alkali metal hydroxide supply line L6. Through the contact, hydrogen sulfide contained in the gas component is dissolved as an alkali metal sulfide in the aqueous solution of an alkali metal hydroxide and thus can be recovered from the gas component. The gas component supplied from the gas delivery line L4 may be brought into contact with the aqueous solution of an alkali metal hydroxide in countercurrent or in co-current, but countercurrent contact is preferred.

In the present embodiment, on the downstream side of the alkali metal hydroxide supply line L6, an additional recovery liquid supply line L5 for supplying an organic polar solvent is connected to near the upper portion of the hydrogen sulfide recovery unit 30. This allows the gas component brought into contact with the aqueous solution of an alkali metal hydroxide to be further brought into contact with the organic polar solvent supplied from the additional recovery liquid supply line L5. The PAS production apparatus further including the additional recovery liquid supply line L5 can absorb and recover hydrogen sulfide remaining in the gas component brought into contact with the aqueous solution of an alkali metal hydroxide by the organic polar solvent. That is, recovering hydrogen sulfide in two stages can further reduce the emission of hydrogen sulfide contained in the gas component produced in the water removal treatment to the outside of the reaction system. The gas component and the organic polar solvent may be brought into contact in countercurrent or in co-current. The aqueous solution of an alkali metal hydroxide may be supplied from the additional recovery liquid supply line L5 instead of the organic polar solvent. As in the case where the organic polar solvent is supplied, hydrogen sulfide can be recovered in two stages through the two-stage contacts, the contact with the aqueous solution of an alkali metal hydroxide supplied from the alkali metal hydroxide supply line L6 and the contact with the aqueous solution of an alkali metal hydroxide supplied from the additional recovery liquid supply line L5. The organic polar solvent or the aqueous solution of an alkali metal hydroxide may be supplied from an organic polar solvent supply line 4 or the alkali metal hydroxide supply line L6 instead of the additional recovery liquid supply line L5.

In the present embodiment, the additional recovery liquid supply line L5 is connected to the hydrogen sulfide recovery unit 30. An additional recovery column may be provided on the downstream side of the hydrogen sulfide recovery unit 30, for example, between the hydrogen sulfide recovery unit 30 and the condensing unit 40 or on the downstream side of the condensing unit 40, and to the additional recovery column may be connected the additional recovery liquid supply line L5.

To the hydrogen sulfide recovery unit 30 is connected a resupply line L7 for supplying a recovered liquid containing the aqueous solution of an alkali metal hydroxide or the organic polar solvent, in which hydrogen sulfide has been recovered, to the water removing polymerization unit 20. The recovered liquid is supplied through the resupply line L7 to the water removing polymerization unit 20. This enables the sulfur source contained in the recovered liquid to be reused as a raw material for the polymerization reaction. Preferably, the organic polar solvent is used as the additional recovery liquid to absorb and recover hydrogen sulfide because this eliminates the need for supplying excess water to the water removing polymerization unit 20 upon the resupply.

When an alkali metal hydroxide is required in the polymerization reaction, an alkali metal hydroxide may be supplied from the raw material supply line L2 of the water removing polymerization unit 20. However, from the viewpoint, such as improving the recovery efficiency for hydrogen sulfide, an aqueous solution of an alkali metal hydroxide supplied from the alkali metal hydroxide supply line L6 or the additional recovery liquid supply line L5, the aqueous solution of an alkali metal hydroxide contained in a recovery liquid, is preferably supplied via the resupply line L7.

The hydrogen sulfide recovery unit 30 is any of those employing a method in which a gas component is brought into contact with an aqueous solution of an alkali metal hydroxide or an organic polar solvent and is not particularly limited, and examples include a wet gas washing column. The wet gas washing column is not particularly limited, and examples include a packed column, a plate column, a spray column (scrubber), and a bubbling absorption column. A packed column is preferably used as the hydrogen sulfide recovery unit 30. A packed column retains a small amount of liquid, thus allows a steady state to be reached early, facilitates achieving a high recovery rate with a small amount of liquid, and in addition, has a low pressure loss.

In addition, in the production apparatus 100 of the present embodiment, when a packed column is used, the gas component produced in the water removing polymerization unit 20 is supplied to the hydrogen sulfide recovery unit 30 without being condensed. The gas component contains hydrogen sulfide, which has a corrosive effect, and the gas component produced in the water removing polymerization unit 20 is supplied to the hydrogen sulfide recovery unit 30 without being condensed. Thus, the gas component has a high temperature and high corrosivity. Thus, the filler to be filled in the packed column is preferably made of a material registrant to high temperature and corrosion. Specifically, examples include metals, such as nickel, nickel alloys, zirconium, zirconium alloys, tantalum, and tantalum alloys; ceramics, such as alumina; and resins.

To the hydrogen sulfide recovery unit 30 is connected a gas delivery line L8 for sending the gas component after brought into contact with the aqueous solution of an alkali metal hydroxide or the organic polar solvent to the condensing unit 40.

Condensing Unit 40

The condensing unit 40 is a device for condensing the gas component after recovering hydrogen sulfide from the gas component in the hydrogen sulfide recovery unit 30. The condensing unit 40 is connected to the hydrogen sulfide recovery unit 30 via the gas delivery line L8. To the condensing unit 40 is supplied through the gas delivery line L8 from the hydrogen sulfide recovery unit 30 the gas component from which hydrogen sulfide has been recovered.

To the condensing unit 40 is connected a waste gas line L10, and the gas after condensation treatment is emitted out of the PAS production apparatus 100 through the waste gas line L10. Before being emitted out of the production apparatus 100, the gas may be brought into contact with an aqueous solution of an alkali metal hydroxide or an organic polar solvent to absorb and recover a trace amount of the remaining hydrogen sulfide. In addition, to the condensing unit 40 is further connected a waste liquid line L11, and a liquid (liquid phase) produced by the condensation treatment is disposed of as waste liquid through the waste liquid line L11. In addition, to the condensing unit 40 is further connected a resupply line L9 for supplying the dihalo aromatic compound contained in the liquid (liquid phase) produced by the condensation treatment to the water removing polymerization unit 20. The dihalo aromatic compound separated from the liquid is supplied to the water removing polymerization unit 20 through the resupply line L9 and can be reused as a raw material for the polymerization reaction. The separation of the dihalo aromatic compound from the liquid (liquid phase) may be performed in the condensing unit 40, or a separation unit may be provided separately. The separation unit may be a liquid-liquid separation unit or a solid-liquid separation unit, and specific examples include a settler.

The condensing unit 40 is not particularly limited, and for example, a known condenser can be used.

Next, a specific example of using a PAS continuous production device as the water removing polymerization unit 20 will be described in detail.

Embodiment of PAS continuous water removing polymerization unit 21

Figure 2:
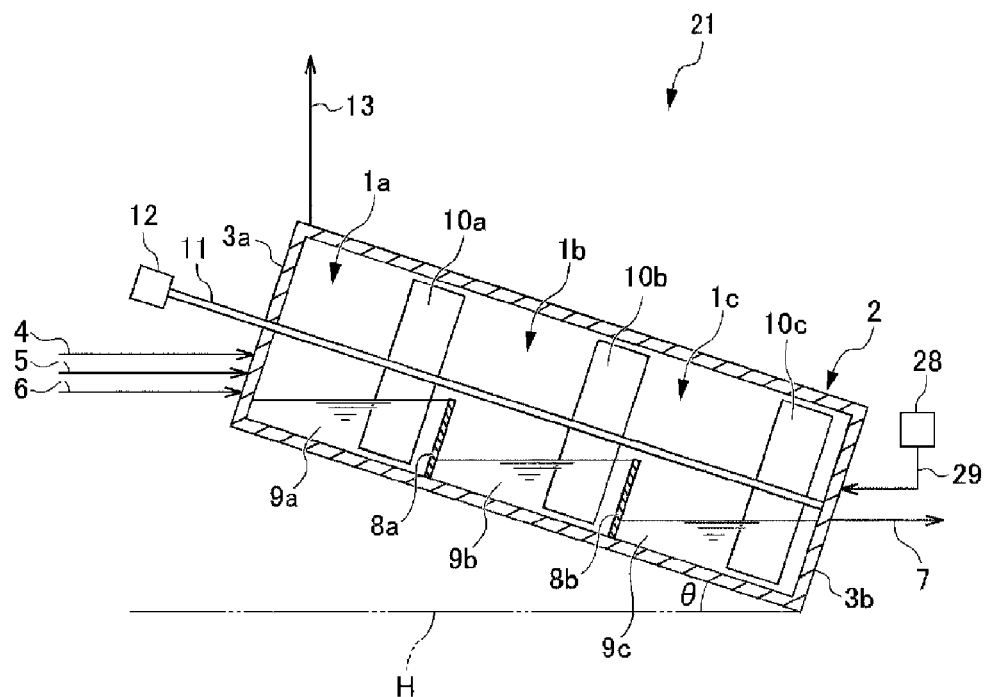
FIG. 2 is a partial cross-sectional view illustrating an embodiment of a PAS continuous water removing polymerization unit when a PAS continuous production device is used as the PAS continuous water removing polymerization unit.

FIG. 2 is a partial cross-sectional view illustrating an embodiment of a PAS continuous water removing polymerization unit 21 when a PAS continuous production device is used as the PAS continuous water removing polymerization unit 21. A configuration of a first embodiment will be described below with reference to FIG. 2.

The PAS continuous water removing polymerization unit 21 according to the first embodiment includes a housing chamber 2 for housing reaction vessels 1a, 1b, and 1c. In the PAS continuous water removing polymerization unit 21, the housing chamber 2 is installed inclined to form an angle θ with respect to a horizontal plane H. The shape of the housing chamber 2 is not particularly limited, and examples include a hollow cylindrical shape or a hollow prismatic shape having side walls 3a and 3b as bottom surfaces, the side wall 3a in contact with the reaction vessel 1a and the side wall 3b in contact with the reaction vessel 1c.

To the side wall 3a of the housing chamber 2 are connected the organic polar solvent supply line 4 for supplying an organic polar solvent to the housing chamber 2, a sulfur source supply line 5 for supplying at least one sulfur source selected from the group consisting of an alkali metal sulfide, an alkali metal hydrosulfide, and hydrogen sulfide to the housing chamber 2, and a dihalo aromatic compound supply line 6 for supplying a dihalo aromatic compound to the housing chamber 2. A water supply line for supplying water to the housing chamber 2 may be connected as necessary. To the side wall 3b of the housing chamber 2 is connected a reaction mixture recovery line 7 for recovering a reaction mixture from the housing chamber 2. The organic polar solvent, the sulfur source, and the dihalo aromatic compound may be supplied to the liquid phase of the reaction vessel 1a via the gas phase or may be directly supplied to the liquid phase of the reaction vessel 1a.

The reaction vessel 1a and the reaction vessel 1b are separated by a partition wall 8a, and the reaction vessel 1b and the reaction vessel 1c are separated by a partition wall 8b. The reaction vessel 1a, the reaction vessel 1b, and the reaction vessel 1c communicate with each other via the gas phase in the housing chamber 2. As a result, the pressure of the gas phase in the housing chamber 2 becomes uniform. The housing chamber 2 is installed inclined to form an angle θ with respect to the horizontal plane H, and thus the maximum liquid surface level of the liquid that can be contained is higher in the order of the reaction vessel 1a, the reaction vessel 1b, and the reaction vessel 1c. The reaction vessel 1a, the reaction vessel 1b, and the reaction vessel 1c are connected in series in the order described above. In each reaction vessel except for the reaction vessel 1a on the uppermost stream side in the moving direction of the reaction mixture, the minimum height of the partition wall on the upstream side in the moving direction is higher than the maximum liquid surface level of the reaction vessel. That is, in the reaction vessel 1b, the minimum height of the partition wall 8a on the upstream side in the moving direction is higher than the maximum liquid surface level of the reaction vessel 1b, and in the reaction vessel 1c, the minimum height of the partition wall 8b on the upstream side in the moving direction is higher than the maximum liquid surface level of the reaction vessel 1c. This prevents a back flow from the reaction vessel 1b to the reaction vessel 1a and a back flow from the reaction vessel 1c to the reaction vessel 1b. The reaction vessel 1a, the reaction vessel 1b, and the reaction vessel 1c can house a reaction mixture 9a, a reaction mixture 9b, and a reaction mixture 9c, respectively. In another embodiment, the maximum liquid surface level of the liquid that can be contained may be adjusted to be higher in the order of the reaction vessel 1a, the reaction vessel 1b, and the reaction vessel 1c not only by installing the housing chamber 2 inclined as described above but also by adjusting the heights of the partition walls.

In the housing chamber 2 are installed on the same shaft 11a stirring blade 10a for stirring the reaction mixture 9a in the reaction vessel 1a, a stirring blade 10b for stirring the reaction mixture 9b in the reaction vessel 1b, and a stirring blade 10c for stirring the reaction mixture 9c in the reaction vessel 1c. The shaft 11 is installed to pass through the side wall 3a from outside the housing chamber 2 and reach the side wall 3b. At the end on the side wall 3a side of the shaft 11 is installed a rotary driving device 12 for rotating the shaft 11.

To the vicinity of the side wall 3a of the housing chamber 2 is connected one end of a gas delivery line 13. To the other end of the gas delivery line 13 is connected the hydrogen sulfide recovery unit (not illustrated in FIG. 2). The hydrogen sulfide recovery unit communicates with the gas phase in the housing chamber 2 through the gas delivery line 13.

To the side wall 3b of the housing chamber 2 is connected a gas feeding unit 28 via a gas supply line 29, the gas feeding unit 28 communicating with the gas phase in the housing chamber 2 and feeding an inert gas to the gas phase from the downstream side toward the upstream side in the moving direction of the reaction mixture, that is, from the reaction vessel 1c toward the reaction vessel 1a. The inert gas is not particularly limited, and examples include noble gases, such as argon; and nitrogen. In another embodiment, to the side wall 3b need not be connected the gas feeding unit 28.

In addition, another PAS continuous production device disclosed in Patent Document 1 can also be used as the PAS continuous water removing polymerization unit 21.

Polyarylene Sulfide

The PAS obtained by the production method of the present embodiment is a linear or branched PAS and is preferably a polyphenylene sulfide (PPS).

The weight average molecular weight (Mw) of the PAS is not particularly limited and ranges widely. The lower limit of the weight average molecular weight of the PAS determined by gel permeation chromatography (GPC) in terms of standard polystyrene is usually 2000 or greater, preferably 10000 or greater, and more preferably 15000 or greater. In addition, the upper limit of the weight average molecular weight is 300000 or less and preferably 100000 or less.

SUMMARY

A method of producing a polyarylene sulfide according to the present embodiment includes:
a polymerizing step in which at least one sulfur source selected from an alkali metal sulfide, an alkali metal hydrosulfide, and hydrogen sulfide and a dihalo aromatic compound are polymerized in an organic polar solvent,
in which the sulfur source is supplied as a raw material mixture containing water,
the method further includes:
a water removal step in which the raw material mixture is heated to remove water;
a hydrogen sulfide recovering step in which hydrogen sulfide contained in a gas component produced in the water removal step is absorbed by an aqueous solution of an alkali metal hydroxide to obtain a recovered liquid; and
a condensation step in which the gas component produced in the water removal step is condensed, and
the hydrogen sulfide recovering step is performed before the condensation step.

In the method of producing a polyarylene sulfide according to the present embodiment, the hydrogen sulfide recovering step may include an alkali metal hydroxide supply step in which the aqueous solution of an alkali metal hydroxide is continuously supplied.

In the method of producing a polyarylene sulfide according to the present embodiment, the polymerizing step, the water removal step, and the hydrogen sulfide recovering step may be performed in parallel.

In the method of producing a polyarylene sulfide according to the present embodiment, the raw material mixture may contain the dihalo aromatic compound.

The method of producing a polyarylene sulfide according to the present embodiment may further include a resupply step in which the recovered liquid obtained in the hydrogen sulfide recovering step is added to the organic polar solvent or the raw material mixture.

In the method of producing a polyarylene sulfide according to the present embodiment, after the hydrogen sulfide recovering step, the method may further include a hydrogen sulfide additional recovering step in which the hydrogen sulfide remaining in the gas component is absorbed and recovered by an organic polar solvent or a further aqueous solution of an alkali metal hydroxide.

In the method of producing a polyarylene sulfide according to the present embodiment, a molar ratio of the sulfur source present in a liquid emitted after the condensation step to the sulfur source contained in the raw material mixture may be 3 mol % or lower.

A water removal treatment method according to the present embodiment is a water removal treatment method for a raw material mixture used in production of a polyarylene sulfide and includes:
a water removal step in which a raw material mixture containing at least one sulfur source selected from an alkali metal sulfide, an alkali metal hydrosulfide, and hydrogen sulfide, and water is heated to remove water;
a hydrogen sulfide recovering step in which hydrogen sulfide contained in a gas component produced in the water removal step is absorbed by an aqueous solution of an alkali metal hydroxide to obtain a recovered liquid; and
a condensation step in which the gas component produced in the water removal step is condensed,
in which the hydrogen sulfide recovering step is performed before the condensation step.

A polyarylene sulfide production apparatus according to the present embodiment includes:
a polymerization unit for polymerizing at least one sulfur source selected from an alkali metal sulfide, an alkali metal hydrosulfide, and hydrogen sulfide and a dihalo aromatic compound in an organic polar solvent,
a water removing unit for heating a raw material mixture containing at least one sulfur source selected from an alkali metal sulfide, an alkali metal hydrosulfide, and hydrogen sulfide, and water to remove water;
a hydrogen sulfide recovery unit for absorbing and recovering hydrogen sulfide contained in a gas component produced in the water removing unit by an aqueous solution of an alkali metal hydroxide; and
a condensing unit for condensing a gas component from which hydrogen sulfide has been recovered by the hydrogen sulfide recovery unit,
in which the hydrogen sulfide recovery unit is provided on an upstream side of the condensing unit.

In the polyarylene sulfide production apparatus according to the present embodiment, the hydrogen sulfide recovery unit includes a filler; and a material of the filler may be at least one material selected from the group consisting of nickel, a nickel alloy, zirconium, a zirconium alloy, tantalum, a tantalum alloy, ceramic, and a resin.

The polyarylene sulfide production apparatus according to the present embodiment may further include a resupply line for supplying a recovered liquid obtained by the hydrogen sulfide recovery unit to the polymerization unit or the water removing unit.

In the polyarylene sulfide production apparatus according to the present embodiment, the hydrogen sulfide recovery unit may include an alkali metal hydroxide supply line through which the aqueous solution of an alkali metal hydroxide is continuously supplied.

In the polyarylene sulfide production apparatus according to the present embodiment, the hydrogen sulfide recovery unit may include an additional recovery liquid supply line through which the organic polar solvent or the aqueous solution of an alkali metal hydroxide is supplied.

In the polyarylene sulfide production apparatus according to the present embodiment, the additional recovery liquid supply line may be provided on a downstream side of the alkali metal hydroxide supply line.

Examples are presented below to describe embodiments of the present invention in further detail. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all documents described in the present specification are incorporated by reference.

EXAMPLES

Example 1

A PAS production apparatus having the configuration illustrated in FIG. 1 was used. A PAS continuous water removing polymerization unit 21 similar to that illustrated in FIG. 2 was used as the water removing polymerization unit 20 except that the housing chamber 2 had six reaction vessels formed by partitioning with five partition walls. This PAS continuous water removing polymerization unit 21 was a reactor made of Ti with a dimension of a diameter of 100 mm and a length of 300 mm with the partition walls being semicircular. To this PAS continuous water removing polymerization unit 21 was charged 950 g of NMP, then a temperature 1 of a part partitioned with a first partition wall and a second partition wall from the upstream side was maintained at 230° C., and a temperature 2 of a part partitioned with a third partition wall and a fourth partition wall from the upstream side at 260° C. Then, using constant-flow pumps, an NMP-pDCB liquid mixture was continuously supplied at a flow rate of 3.12 g/min (NMP:pDCB (mass ratio) of 940:930) from the dihalo aromatic compound supply line 6, and a 38 mass % aqueous solution of NaSH was continuously supplied at a flow rate of 1.54 g/min from the sulfur source supply line 5. On the other hand, from the gas supply line 29 on the downstream side of the PAS continuous water removing polymerization unit 21, nitrogen was pumped at a flow rate of 20 mL/min. In addition, to the hydrogen sulfide recovery unit 30, which was a packed column connected to the PAS continuous water removing polymerization unit 21, NMP was continuously supplied at 1.57 g/min from the additional recovery liquid supply line L5 to the upper portion of the packed column, and at the same time, a 25 mass % aqueous solution of NaOH was continuously supplied at 1.54 g/min from the alkali metal hydroxide supply line L6 to the central portion of the packed column. These were brought into countercurrent contact with a gas phase pumped from the PAS continuous water removing polymerization unit 21 (specifically, a gas phase from the gas delivery line 13 in FIG. 2 and a gas phase from the gas delivery line L4 in FIG. 1). A liquid phase from the hydrogen sulfide recovery unit 30 was pumped through the resupply line L7 into the reaction vessel 1a of the PAS continuous water removing polymerization unit 21. From a gas phase flowing out from the hydrogen sulfide recovery unit 30 through the gas delivery line L8, water was continuously removed by the PAS continuous water removing polymerization unit 21 using the condensing unit 40 while the pressure was controlled at a gauge pressure of 0.32 MPa by a pressure adjustment valve. Furthermore, pDCB associated with the removed water was separated by a settler constituting a part of the condensing unit 40 and returned to the reaction vessel 1a of the PAS continuous water removing polymerization unit 21 through the resupply line L9. Water and a trace amount of the sulfur source were disposed of through the waste liquid line L11. Furthermore, a gas from the condensing unit 40 was passed through 5 kg of a 5 mass % aqueous solution of sodium hydroxide to completely absorb/recover an extremely trace amount of hydrogen sulfide and then released to the atmosphere from the waste gas line 10. The polymerization reaction product was continuously overflowed from the reaction mixture recovery line 7 of the PAS continuous water removing polymerization unit 21, extracted, and cooled.

The operation described above was continued for 9 hours, and the material balance was examined for the sulfur source. Specifically, the amount of the sulfur source supplied through the raw material supply line L2 (sulfur source supply line 5 of FIG. 2 in the present Example 1) and the amount of the sulfur source lost through the waste gas line L10 and the waste liquid line L11 were measured in terms of hydrogen sulfide. The results are shown in Table 1.

TABLE 1

|  | Amount supplied | Amount lost | |
| --- | --- | --- | --- |
|  | L2 | L10 | L11 |
| Amount of sulfur source in terms of H$_2$S (mmol/min) | 10.45 | 0.003 | 0.01 |
| Ratio to amount supplied (mol %) | 100 | 0.03 | 0.11 |
|  |  | 0.14 | |

Example 2

The same procedure as in Example 1 was performed except that the line for supplying NMP at 1.57 g/min to the hydrogen sulfide recovery unit 30 was changed from the additional recovery liquid supply line L5 to the alkali metal hydroxide supply line L6 (i.e., the alkali metal hydroxide was supplied by the same line). The operation described above was continued for 9 hours, and the material balance was examined for the sulfur source. The results are shown in Table 2.

TABLE 2

|  | Amount supplied | Amount lost | |
| --- | --- | --- | --- |
|  | L2 | L10 | L11 |
| Amount of sulfur source in terms of H$_2$S (mmol/min) | 10.45 | 0.007 | 0.03 |
| Ratio to amount supplied (mol %) | 100 | 0.07 | 0.30 |
|  |  | 0.37 | |

Example 3

The same procedure as in Example 1 was performed except that the line for supplying NMP at 1.57 g/min to the hydrogen sulfide recovery unit 30 was changed from the additional recovery liquid supply line L5 to the organic polar solvent supply line L4 connected to the PAS continuous water removing polymerization unit 21. The operation described above was continued for 9 hours, and the material balance was examined for the sulfur source. The results are shown in Table 3.

TABLE 3

|  | Amount supplied | Amount lost | |
| --- | --- | --- | --- |
|  | L2 | L10 | L11 |
| Amount of sulfur source in terms of $H_2S$ (mmol/min) | 10.45 | 0.021 | 0.09 |
| Ratio to amount supplied (mol %) | 100 | 0.20 | 0.87 |
|  |  | 1.07 | |

Comparative Example 1

Figure 3:
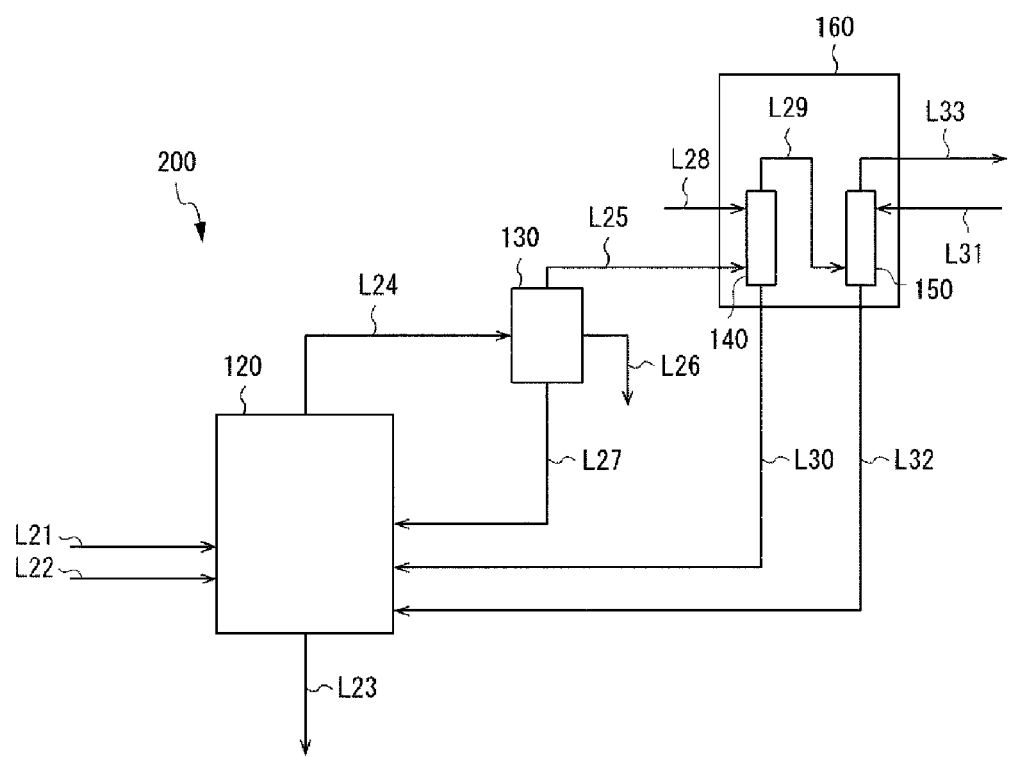
FIG. 3 is a schematic diagram illustrating an example of a PAS production apparatus according to the related art.

A PAS production apparatus having the configuration illustrated in FIG. 3 was used. FIG. 3 is a schematic diagram illustrating an example of a PAS production apparatus according to the related art. The schematic diagram was prepared in accordance with the diagram and description of the present application with reference to Patent Document 1.

First, the PAS production apparatus illustrated in FIG. 3 will be described. A PAS production apparatus 200 includes, from the upstream side toward the downstream side, a water removing polymerization unit 120, a condensing unit 130, a hydrogen sulfide recovery unit 160 (including a first hydrogen sulfide recovery unit 140 and a second hydrogen sulfide recovery unit 150). The condensing unit 130 communicates with the water removing polymerization unit 120 through a gas delivery line L24. The first hydrogen sulfide recovery unit 140 communicates with the condensing unit 130 through a gas delivery line L25. The second hydrogen sulfide recovery unit 150 communicates with the first hydrogen sulfide recovery unit 140 through a gas delivery line L29. The condensing unit 130 condenses a gas phase containing water, a dihalo aromatic compound, an organic polar solvent, and hydrogen sulfide, and the organic polar solvent and the dihalo aromatic compound are resupplied to the water removing polymerization unit 120 through a resupply line L27. The organic polar solvent is supplied to the first hydrogen sulfide recovery unit 140 through an organic polar solvent supply line L28, and the aqueous solution of an alkali metal hydroxide is supplied to the second hydrogen sulfide recovery unit 150 through an alkali metal hydroxide supply line L31, and these solvent and solution are brought into contact with a gas condensed in the condensing unit 130. Then, hydrogen sulfide contained in the gas condensed in the condensing unit 130 is absorbed and recovered in the first hydrogen sulfide recovery unit 140 and the second hydrogen sulfide recovery unit 150. The recovered liquid obtained in the first hydrogen sulfide recovery unit 140 is resupplied to the water removing polymerization unit 120 through a recovered liquid line L30, and the recovered liquid obtained in the second hydrogen sulfide recovery unit is resupplied to the water removing polymerization unit 120 through a recovered liquid line L32, and these recovered liquids are reused as a raw material for the dehydration polymerization reaction. In the PAS production apparatus 200 of FIG. 3, the recovery treatment of hydrogen sulfide is performed after the water removal treatment of the raw material mixture and the condensation treatment of the gas component produced in the water removal treatment.

The same PAS continuous water removing polymerization unit 21 as in Example 1 was used as the water removing polymerization unit 120. To this PAS continuous water removing polymerization unit 21 was charged 950 g of NMP, then a temperature 1 of a part partitioned with a first partition wall and a second partition wall from the upstream side was maintained at 230° C., and a temperature 2 of a part partitioned with a third partition wall and a fourth partition wall from the upstream side at 260° C. Then, using constant-flow pumps, an NMP-pDCB liquid mixture was continuously supplied at a flow rate of 3.52 g/min (NMP:pDCB (mass ratio) of 990:278) from the dihalo aromatic compound supply line 6, and a 36 mass % aqueous solution of NaSH was continuously supplied at a flow rate of 0.84 g/min from the sulfur source supply line 5. At the same time, using the condensing unit 130 connected to the PAS continuous water removing polymerization unit 21 through the gas delivery line 13, water was continuously removed by the PAS continuous water removing polymerization unit 21 while the pressure was controlled at a gauge pressure of 0.32 MPa by a pressure adjustment valve. Furthermore, pDCB associated with the removed water was separated by a settler constituting a part of the condensing unit 130 and returned to the reaction vessel 1a of the PAS continuous water removing polymerization unit 21 through the resupply line L27. The condensed water and the sulfur source were disposed of through a waste liquid line L26. A gas from the condensing unit 130 was supplied through the gas delivery line L25 to the first hydrogen sulfide recovery unit 140, which was a packed column, and brought into contact with NMP flowed at a flow rate of 0.5 g/min in countercurrent. NMP was supplied from the organic polar solvent supply line L28. A liquid phase from the first hydrogen sulfide recovery unit 140 was returned through the recovered liquid line L30 to the reaction vessel 1a of the PAS continuous water removing polymerization unit 21. On the other hand, a gas from the first hydrogen sulfide recovery unit 140 was supplied through the gas delivery line L29 to the second hydrogen sulfide recovery unit 150, which was a packed column, and brought into contact with a 15.84 mass % aqueous solution of sodium hydroxide flowed at a flow rate of 1.37 g/min in countercurrent. The aqueous solution of sodium hydroxide was supplied from the alkali metal hydroxide supply line L31. A liquid phase from the second hydrogen sulfide recovery unit 150 was returned through the recovered liquid line L32 to the reaction vessel 1a of the PAS continuous water removing polymerization unit 21. On the other hand, hydrogen sulfide was completely absorbed and recovered by passing through 5 kg of a 5 mass % aqueous solution of sodium hydroxide from a waste gas line L33 from the second hydrogen sulfide recovery unit 150 and then released to the atmosphere. A polymerization reaction product was continuously extracted from the PAS continuous water removing polymerization unit 21 through a reaction mixture recovery line L23 and cooled.

The operation described above was continued for 5 hours, and the material balance was examined for the sulfur source. Specifically, the amount of the sulfur source supplied through a raw material supply line L22 (the sulfur source supply line 5 of FIG. 2 in the present Comparative Example 1) and the amount of the sulfur source lost through the waste liquid line L26 and the waste gas line L33 were measured in terms of hydrogen sulfide. The results are shown in Table 4.

TABLE 4

|  | Amount supplied | Amount lost | |
| --- | --- | --- | --- |
|  | L22 | L26 | L33 |
| Amount of sulfur source in terms of $H_2S$ (mmol/min) | 5.40 | 0.207 | 0.0163 |

TABLE 4-continued

| | Amount supplied | Amount lost | |
|---|---|---|---|
| | L22 | L26 | L33 |
| Ratio to amount supplied (mol %) | 100 | 3.82 | 0.30 |
| | | 4.13 | |

Comparative Example 2

The material balance was examined for sulfur in the same manner as in Comparative Example 1 except that the operation time was changed from 5 hours to 2 hours, and the flow rate of the NMP-pDCB liquid mixture was changed to 3.54 g/min and the composition to NMP:pDCB (mass ratio) of 988:286. The results are shown in Table 5.

TABLE 5

| | Amount supplied | Amount lost | |
|---|---|---|---|
| | L22 | L26 | L33 |
| Amount of sulfur source in terms of $H_2S$ (mmol/min) | 5.40 | 0.207 | 0.0393 |
| Ratio to amount supplied (mol %) | 100 | 3.83 | 0.07 |
| | | 3.90 | |

Comparative Example 3

The material balance was examined for sulfur in the same manner as in Comparative Example 1 except that the operation time was changed from 5 hours to 7 hours, the flow rate of the NMP-pDCB liquid mixture was changed to 3.55 g/min and the composition to NMP:pDCB (mass ratio) of 986:294, and the flow rate of the 15.84 mass % aqueous solution of sodium hydroxide was changed to 1.36 g/min. The results are shown in Table 6.

TABLE 6

| | Amount supplied | Amount lost | |
|---|---|---|---|
| | L22 | L26 | L33 |
| Amount of sulfur source in terms of $H_2S$ (mmol/min) | 5.40 | 0.207 | 0.0783 |
| Ratio to amount supplied (mol %) | 100 | 3.83 | 1.45 |
| | | 5.28 | |

Summary of Examples and Comparative Examples

The PAS production apparatus of Examples 1 to 3 enabled reducing the loss amount of the sulfur source compared to the PAS production apparatus of Comparative Examples 1 to 3 and in particular, significantly reduced the amount of the sulfur source contained in the waste liquid. In the PAS production apparatus of Comparative Examples 1 to 3, hydrogen sulfide was recovered from the condensed gas by bringing the aqueous solution of sodium hydroxide into contact with the gas after condensation treatment. On the other hand, in the PAS production apparatus of Examples 1 to 3, hydrogen sulfide was recovered from the gas component from the continuous production device by bringing the gas component into contact with the aqueous solution of sodium hydroxide before condensing the gas component. These results revealed that, in the production of a PAS, the emission of hydrogen sulfide to the outside of the reaction system can be significantly reduced by performing the recovery treatment of hydrogen sulfide contained in the gas produced by the water removal treatment of the raw material before condensing the gas component produced in the water removal treatment.

REFERENCE SIGNS LIST 1a to 1c: Reaction vessel
2: Housing chamber
3a, 3b: Side wall
4: Organic polar solvent supply line
5: Sulfur source supply line
6: Dihalo aromatic compound supply line
7: Reaction mixture recovery line
8a, 8b: Partition wall
9a to 9c: Reaction mixture
10a to 10c: Stirring blade
11: Shaft
12: Rotary driving device
13: Gas delivery line
20, 120: Water removing polymerization unit
21: PAS continuous water removing polymerization unit
28: Gas feeding unit
29: Gas supply line
30, 160: Hydrogen sulfide recovery unit
40, 130: Condensing unit
100, 200: PAS production apparatus
140: First hydrogen sulfide recovery unit
150: Second hydrogen sulfide recovery unit
L1, L21: Gas supply line
L2, L22: Raw material supply line
L3, L23: Reaction mixture recovery line
L4, L8, L24, L25, L29: Gas delivery line
L5: Additional recovery liquid supply line
L6, L31: Alkali metal hydroxide supply line
L7: Resupply line
L9, L27: Resupply line
L10, L33: Waste gas line
L11, L26: Waste liquid line
L28: Organic polar solvent supply line
L30, L32: Recovered liquid line

The invention claimed is:
1. A method of producing a polyarylene sulfide, the method comprising:
 a polymerizing step in which at least one sulfur source selected from an alkali metal sulfide, an alkali metal hydrosulfide, and hydrogen sulfide and a dihalo aromatic compound are polymerized in an organic polar solvent,
 wherein the sulfur source is supplied as a raw material mixture containing water,
 the method further comprises:
 a water removal step in which the raw material mixture is heated to remove water;
 a hydrogen sulfide recovering step in which hydrogen sulfide contained in a gas component produced in the water removal step is absorbed by an aqueous solution of an alkali metal hydroxide to obtain a recovered liquid; and
 a condensation step in which the gas component produced in the water removal step is condensed, and
 the hydrogen sulfide recovering step is performed before the condensation step.

2. The method of producing a polyarylene sulfide according to claim 1, wherein the hydrogen sulfide recovering step comprises an alkali metal hydroxide supply step in which the aqueous solution of an alkali metal hydroxide is continuously supplied.

3. The method of producing a polyarylene sulfide according to claim 1, wherein the polymerizing step, the water removal step, and the hydrogen sulfide recovering step are performed in parallel.

4. The method of producing a polyarylene sulfide according to claim 1, wherein the raw material mixture contains the dihalo aromatic compound.

5. The method of producing a polyarylene sulfide according to claim 1, further comprising a resupply step in which the recovered liquid obtained in the hydrogen sulfide recovering step is added to the organic polar solvent or the raw material mixture.

6. The method of producing a polyarylene sulfide according to claim 1, further comprising, after the hydrogen sulfide recovering step, a hydrogen sulfide additional recovering step in which the hydrogen sulfide remaining in the gas component is absorbed and recovered by an organic polar solvent or a further aqueous solution of an alkali metal hydroxide.

7. The method of producing a polyarylene sulfide according to claim 1, wherein a molar ratio of a sulfur source present in a liquid emitted after the condensation step to a sulfur source contained in the raw material mixture is 3 mol % or lower.

8. A water removal treatment method for a raw material mixture used in production of a polyarylene sulfide, the method comprising:
   a water removal step in which a raw material mixture containing at least one sulfur source selected from an alkali metal sulfide, an alkali metal hydrosulfide, and hydrogen sulfide, and water is heated to remove water;
   a hydrogen sulfide recovering step in which hydrogen sulfide contained in a gas component produced in the water removal step is absorbed by an aqueous solution of an alkali metal hydroxide to obtain a recovered liquid; and
   a condensation step in which the gas component produced in the water removal step is condensed,
   wherein the hydrogen sulfide recovering step is performed before the condensation step.

9. A polyarylene sulfide production apparatus comprising:
   a polymerization unit for polymerizing at least one sulfur source selected from an alkali metal sulfide, an alkali metal hydrosulfide, and hydrogen sulfide and a dihalo aromatic compound in an organic polar solvent,
   a water removing unit for heating a raw material mixture containing at least one sulfur source selected from an alkali metal sulfide, an alkali metal hydrosulfide, and hydrogen sulfide, and water to remove water;
   a hydrogen sulfide recovery unit for absorbing and recovering hydrogen sulfide contained in a gas component produced in the water removing unit by an aqueous solution of an alkali metal hydroxide; and
   a condensing unit for condensing a gas component from which hydrogen sulfide has been recovered by the hydrogen sulfide recovery unit,
   wherein the hydrogen sulfide recovery unit is provided on an upstream side of the condensing unit.

10. The polyarylene sulfide production apparatus according to claim 9, wherein
   the hydrogen sulfide recovery unit comprises a filler; and
   a material of the filler is at least one material selected from the group consisting of nickel, a nickel alloy, zirconium, a zirconium alloy, tantalum, a tantalum alloy, ceramic, and a resin.

11. The polyarylene sulfide production apparatus according to claim 9, further comprising a resupply line for supplying a recovered liquid obtained by the hydrogen sulfide recovery unit to the polymerization unit or the water removing unit.

12. The polyarylene sulfide production apparatus according to claim 9, wherein the hydrogen sulfide recovery unit comprises an alkali metal hydroxide supply line through which the aqueous solution of an alkali metal hydroxide is continuously supplied.

13. The polyarylene sulfide production apparatus according to claim 12, wherein the hydrogen sulfide recovery unit further comprises an additional recovery liquid supply line through which the organic polar solvent or the aqueous solution of an alkali metal hydroxide is supplied.

14. The polyarylene sulfide production apparatus according to claim 13, wherein the additional recovery liquid supply line is provided on a downstream side of the alkali metal hydroxide supply line.

* * * * *